Jan. 15, 1946.    C. A. ATWELL    2,393,011
CONTROL SYSTEM
Filed Aug. 25, 1944
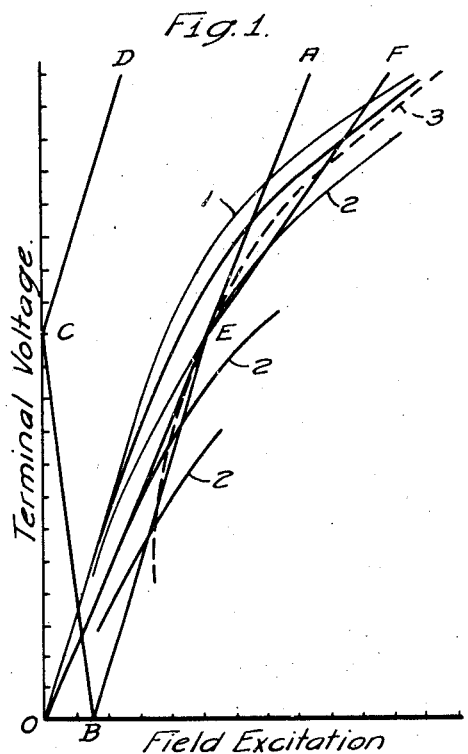
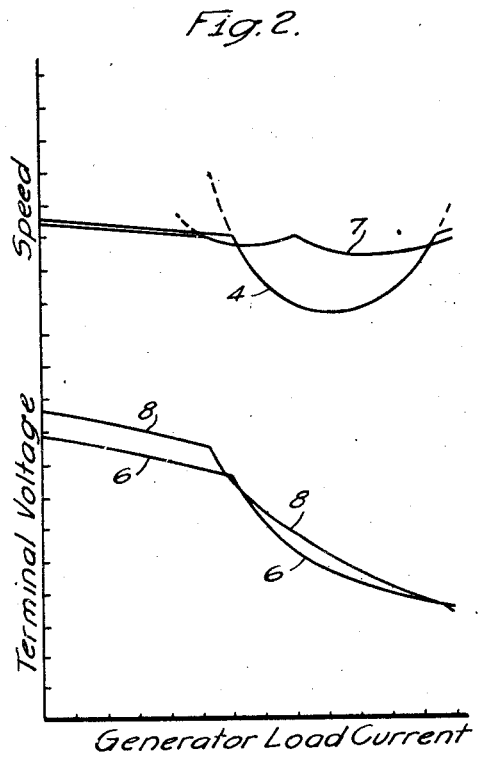
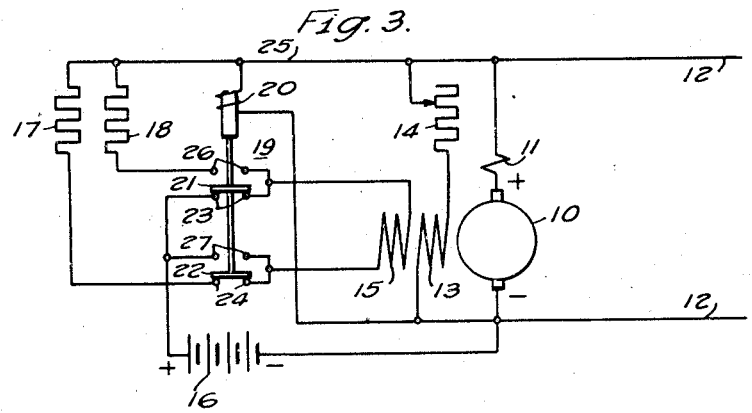
WITNESSES:
E. A. M?Closkey
7. P. Ly?
INVENTOR
Clarence A. Atwell.
BY O. B. Buchanan
ATTORNEY Patented Jan. 15, 1946

2,393,011

UNITED STATES PATENT OFFICE 2,393,011

CONTROL SYSTEM

Clarence A. Atwell, Pittsburgh, Pa., assignor to Westinghouse Electric Corporation, East Pittsburgh, Pa., a corporation of Pennsylvania Application August 25, 1944, Serial No. 551,115

7 Claims. (Cl. 171—223)

The present invention relates to direct-current generators, and more particularly to a generator intended to be driven by an internal combustion engine. The invention is especially applicable to direct-current generators driven by Diesel engines, such as the generators used on Diesel-electric locomotives, although the invention is obviously not restricted to this particular application and may be used in any engine-driven generator. Similar subject matter is found in applicant's co-pending application 551,116 filed of even date.

In order to obtain the maximum power and, therefore, the most satisfactory operation, from a Diesel engine operating at full throttle, the engine must run at substantially constant speed. When such an engine is used to drive an electric generator, this means that the required power input to the generator must remain constant over substantially the full range of generator load current. If this condition is not satisfied, and the generator characteristic is such that the power input to the generator increases when the generator load current increases, the engine will be overloaded, and its speed will drop, resulting in a decrease in power, causing the engine to labor. Similarly, if the power input to the generator drops when the generator load current drops, the engine will be underloaded, and its speed will increase, permitting it to race, unless the engine is provided with a governor, which again reduces the power to prevent over-speeding. Thus, in order to obtain the most satisfactory engine performance by substantially constant-speed operation, it is necessary for the generator characteristics to be such that it requires substantially constant power input from its prime mover over most or all of the normal operating range of load currents.

In order to satisfy this condition of constant power input in a direct-current generator with varying load current, the generator voltage must vary as the load current varies, in such a manner that the product of voltage and load current, divided by the efficiency at the particular load current, remains substantially constant over the full normal range of current. This variation of the generator voltage is most readily obtained by controlling the excitation of the generator in such a way that the generator voltage changes with the load current in the desired manner. This result may be obtained by separately exciting the generator from a separate exciter, the excitation of which is controlled by a suitable regulator so as to cause the generator excitation to vary in the desired manner. The special exciter and its associated regulator and control equipment, however, add considerably to the cost of the complete generator installation, and this solution of the problem is not suitable for relatively small generators, such as those used on switch engines, for example.

The principal object of the present invention is to provide a direct-current generator in which the field excitation is controlled so as to approach a condition of constant load on the prime mover which drives the generator as the generator load current varies over a relatively wide range.

Another object of the invention is to provide a method and means for controlling the excitation of a direct-current generator in a simple and inexpensive manner so as to closely approximate the excitation required for constant load on the prime mover which drives the generator as the generator load current varies over a relatively wide range.

A further object of the invention is to provide a direct-current generator having a main self-excited field winding and an auxiliary field winding, in which the excitation of the auxiliary field winding is controlled in such a manner that the resultant excitation closely approximates that required for constant power input to the generator as the generator load current varies.

A more specific object of the invention is to provide a direct-current generator having a main self-excited field winding and an auxiliary field winding, in which the excitation of the auxiliary field winding is controlled to cause it to vary inversely with the generator voltage when the generator voltage is below a predetermined value, and to cause it to vary directly with the generator voltage when the voltage is above the predetermined value, so that the resultant excitation closely approximates the excitation required for the condition of constant power input to the generator.

The invention will be more fully understood from the following detailed description, taken in connection with the accompanying drawing, in which:

Figures 1 and 2 are explanatory diagrams, and

Fig. 3 is a schematic wiring diagram showing a preferred embodiment of the invention.

A complete understanding of the invention will be facilitated by first referring to the curves of Fig. 1. In this figure there is shown a no-load saturation curve I of a typical direct-current generator, and a family of load saturation curves 2 corresponding to various generator load currents. There are also shown in Fig. 1 several excitation lines, that is, lines or curves showing the relation between the generator terminal voltage and the corresponding field excitation obtained at any voltage. The dotted curve 3 is the theoretical excitation line required to cause the generator voltage to vary as the load current varies in the manner necessary to obtain constant power input to the generator. In other words, this curve shows, for each value of load current, the voltage required at that load current to give constant power input, and the corresponding value of field excitation necessary to obtain that voltage. It will be obvious that such an excitation curve cannot be obtained, or even approximated, by a straight-line excitation characteristic such as that of the conventional self-excited shunt generator.

Engine-driven generators have been used which were provided with a self-excited shunt field with the excitation adjusted so that the excitation line would intersect the theoretical excitation curve 3 in two points near the upper and lower limits of the range of expected load currents, in order to approximate the theoretical curve 3 as closely as possible with a straight-line excitation curve. Such an arrangement, however, does not give satisfactory performance, since it gives the correct value of excitation at only two points. Between these points, the excitation is too great, and the load on the prime mover increases, causing its speed to drop, while above and below these points, the excitation is too low, and the engine is underloaded, causing it to overspeed. This effect is illustrated by the curve 4 in Fig. 2, which shows the marked drop in speed over the intermediate portion of the load range, and the increase in speed at the upper and lower portions of the load range, as indicated by the dotted portions of the curve. The solid end portions of the curve show the effect of a governor in holding the speed down with, of course, a corresponding reduction in power. The voltage curve 6 of Fig. 2 shows the corresponding voltage regulation.

In accordance with the present invention, it is proposed to obtain a much closer approximation of the theoretical excitation curve 3 by providing a self-excited component of excitation and an additional separately excited component of excitation which is made to vary in such a manner that the resultant excitation closely approximates the curve 3 over the greater part of the load range. In order to do this, the generator is provided with a main self-excited field winding, which provides a component of excitation following the excitation line OA which is, of course, a straight line. The self-excited excitation is adjusted so as to make the line OA tangent to the curve 3. The generator is also provided with a separately excited auxiliary field winding which provides an auxiliary component of excitation. The auxiliary component of excitation is controlled so that it follows the line BCD, that is, at low voltages, the auxiliary component of excitation is caused to vary inversely with the generator voltage until it reaches zero at the point C, which is the value of generator voltage corresponding to the point of tangency of the line OA with the curve 3. When the generator voltage increases above this value, the auxiliary component of excitation is varied directly with the generator voltage, as shown by the portion CD of the auxiliary excitation line. The resultant excitation of the generator is the sum of the excitation line OA and the excitation line BCD, giving the line BEF. It will be apparent that the line BEF is a close approximation to the theoretical excitation curve 3 over most of the normal operating range, and is a much closer approximation than could possibly be obtained by a straight-line excitation curve, such as that of a self-excited generator.

The curve 7 in Fig. 2 shows the engine speed, and curve 8 shows the corresponding voltage regulation, obtained when the generator excitation varies in accordance with the line BEF. It will be apparent that the engine speed remains very close to the desired constant value over a wide range of generator load current and that the corresponding generator voltage regulation is greatly improved as compared to that obtained with a completely self-excited generator. The portions BC and CD of the auxiliary excitation line are shown in Fig. 1 as being of different slopes, and it will be understood that the slopes of these two portions of the line can be separately adjusted as required by the characteristics of a particular generator to obtain the desired close approximation to the curve 3. Thus, by controlling the generator excitation in the manner described, and illustrated in Fig. 1, the generator can be made to approach quite closely to the desired characteristic of constant power input, and thus the maximum full throttle power of a Diesel engine, or other internal combustion engine, driving the generator can effectively be utilized.

A preferred arrangement for carrying out the invention is shown in Fig. 3. This figure shows a direct-current generator 10, having a series-connected commutating field winding 11, and connected to supply a load circuit 12. The generator 10 has a main shunt field winding 13 connected across its terminals in series with a shunt field rheostat 14, which is adjusted so that the excitation provided by the field winding 13 follows a line such as OA in Fig. 1, tangent to the theoretically required excitation curve for constant power input. The generator also has an auxiliary field winding 15, which is wound so as to be additive to the main shunt field winding 13, and which is supplied by a substantially constant-voltage source of excitation such as a battery 16, the voltage of which is made equal to the voltage corresponding to point C of Fig. 1. The battery 16 is connected in a series circuit with the generator 10 in such a manner that the battery voltage opposes the generator voltage. The series circuit also includes the auxiliary field winding 15 and one or the other of two resistors 17 and 18. The connection of the resistors 17 and 18 and the auxiliary winding 15 in the auxiliary excitation circuit is controlled by a voltage relay 19 which has an operating coil 20 connected across the generator voltage. The relay 19 has two movable contacts 21 and 22 through which the auxiliary winding 15 is connected in the circuit, the movable contacts 21 and 22 bridging either fixed contacts 23 and 24, respectively, or fixed contacts 26 and 27, respectively.

The operation of this system is as follows. When the generator is at rest with zero voltage, or when the load current is high and the generator voltage is below the value corresponding to the point C of Fig. 1, the relay 19 is in its de-energized position shown in the drawing. In this position of the relay, current flows from the battery 16 through the relay contact 21 and fixed contacts 23, the auxiliary field winding 15, the relay contact 22 and fixed contacts 24, the resistor 17, conductor 25, generator 10 and back to the battery. Since the battery voltage opposes the generator voltage, and since the battery voltage is greater than the generator voltage in this part of the load range, the magnitude of the current flowing through the auxiliary field winding 15 will be determined by the voltage difference between the battery and the generator, and, as the generator voltage rises with decreasing load current, this difference will decrease so that the auxiliary field winding current will decrease as the generator voltage increases, and the auxiliary field excitation will follow a line such as BC in Fig. 1, the slope of the line being determined by the adjustment of the resistor 17.

When the generator voltage reaches the value corresponding to the point C of Fig. 1, it is approximately equal to the battery voltage, and the auxiliary field winding current will be substantially zero. The relay 19 is set to operate at this voltage, opening the lower contacts 23 and 24 and bridging the upper pairs of fixed contacts 26 and 27. As the generator voltage increases with further decrease in load current, current will flow from the generator 10 through the conductor 25, resistor 18, relay contacts 26 and 21, auxiliary field winding 15, relay contacts 22 and 27, battery 16, and back to the generator. Since the generator voltage is now greater than the battery voltage, the direction of current flow is reversed with respect to the battery, so that the battery will be charged. It will be noted, however, that the operation of the relay 19 reverses the connection of the auxiliary field winding 15, so that current in this winding flows in the same direction as before. Since the generator voltage is now greater than the battery voltage, the auxiliary field winding current will increase as the generator voltage increases, and the auxiliary field excitation follows a line such as CD in Fig. 1, varying directly with the generator voltage, the slope of the line being determined by adjustment of the resistor 18.

By using different resistors 17 and 18 in series with the auxiliary field winding for operation above and below the generator voltage C, the slopes of the excitation lines in these two different ranges can be made different, as illustrated in Fig. 1, so that by suitable adjustment of the two resistors the resultant excitation of the generator, which is the sum of the auxiliary field excitation and the main field excitation, can be made to closely approximate the theoretical excitation curve for constant power input to the generator, as explained above in connection with Fig. 1. At low values of generator voltage, the battery 16 will cause some current to flow through the shunt field winding 13 and this effect should be taken into consideration in determining the setting of the resistor 17 which is in series with the auxiliary field winding 15 during operation in the lower voltage range.

It should now be apparent that a relatively simple and inexpensive means has been provided for controlling the excitation of a direct-current generator so that the generator voltage varies with load current in a manner to closely approach a condition of constant load on the prime mover which drives the generator, and that this result is accomplished without requiring any special exciter or voltage regulator, and by using only a simple voltage relay with a suitable source of separate excitation. It is to be understood, of course, that the specific embodiment of the invention shown in Fig. 3 and described in detail is only illustrative, and that various other arrangements are possible within the scope of the invention for obtaining the desired excitation characteristics as shown by the excitation curves BCD and BEF of Fig. 1. It is also to be understood that the circuit of Fig. 3 is capable of various modifications within the scope of the invention. Thus, for example, in place of the battery 16, a small constant-voltage pilot generator might be used as a source of separate excitation of the field winding. Obviously other modifications might be made, and it is to be understood therefore that the invention is not limited to the specific arrangement shown, but in its broadest aspects, it includes all equivalent embodiments and modifications which come within the scope of the appended claims.

I claim as my invention:

1. A direct-current generator having a main self-excited field winding and an auxiliary field winding, and means for exciting said auxiliary field winding to provide a component of excitation which varies inversely with the generator voltage when the voltage is below a predetermined value and directly with the generator voltage when the voltage is above said value.

2. A direct-current generator having a main self-excited field winding and an auxiliary field winding, and means for exciting said auxiliary field winding to provide a component of excitation which decreases with increasing generator voltage until the generator voltage reaches a predetermined value and which increases with increasing generator voltage when the generator voltage rises above said value.

3. A direct-current generator having a main self-excited field winding, an auxiliary field winding, a separate voltage source for exciting said auxiliary field winding, said separate voltage source being connected so that the current in the auxiliary field winding is dependent on the generator voltage, and means for connecting the auxiliary field winding and separate voltage source so that the current in the auxiliary field winding decreases with increasing generator voltage when the generator voltage is below a predetermined value and increases with increasing generator voltage when the generator voltage is above said value.

4. A direct-current generator having a main self-excited field winding, an auxiliary field winding, separate, substantially constant-voltage means for exciting said auxiliary field winding, said separate exciting means and auxiliary field winding being connected in a series circuit with the generator, with the voltage of the separate exciting means opposing the generator voltage, and means for reversing the connection of the auxiliary field winding when the voltages of the separate exciting means and of the generator become approximately equal.

5. A direct-current generator having a main self-excited field winding, an auxiliary field winding, separate, substantially constant-voltage means for exciting said auxiliary field winding, said separate exciting means and auxiliary field winding being connected in a series circuit with the generator, with the voltage of the separate exciting means opposing the generator voltage, and means responsive to the generator voltage for effecting reversal of the connection of the auxiliary field winding when the generator voltage becomes approximately equal to the voltage of the separate exciting means.

6. A direct-current generator having a main self-excited field winding, an auxiliary field winding, separate, substantially constant-voltage means for exciting said auxiliary field winding, said separate exciting means being connected in series relation with the generator with the voltage of the separate exciting means opposing the generator voltage, two resistors alternatively connectible in series relation with the separate exciting means, and means for connecting the auxiliary field winding and one of said resistors in series with the separate exciting means and the generator when the generator voltage is below the voltage of the separate exciting means and for connecting the auxiliary field winding in the reverse direction and the other of said resistors in series with the separate exciting means and the generator when the generator voltage is above the voltage of the separate exciting means.

7. A direct-current generator having a main self-excited field winding, an auxiliary field winding, separate, substantially constant-voltage means for exciting said auxiliary field winding, said separate exciting means being connected in series relation with the generator with the voltage of the separate exciting means opposing the generator voltage, two resistors alternatively connectible in series relation with the separate exciting means, and relay means responsive to the generator voltage for connecting the auxiliary field winding and one of said resistors in series with the separate exciting means and the generator when the generator voltage is below the voltage of the separate exciting means and for connecting the auxiliary field winding in the reverse direction and the other of said resistors in series with the separate exciting means and the generator when the generator voltage is above the voltage of the separate exciting means.

CLARENCE A. ATWELL.